(12) United States Patent
Oguma et al.

(10) Patent No.: US 10,576,835 B2
(45) Date of Patent: Mar. 3, 2020

(54) ENERGY STORAGE DEVICE, TRANSPORT APPARATUS, AND CONTROL METHOD

(71) Applicant: HONDA MOTOR CO., LTD., Tokyo (JP)

(72) Inventors: Hirokazu Oguma, Wako (JP); Yoshihiro Ito, Wako (JP); Daijiro Takizawa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 453 days.

(21) Appl. No.: 15/335,432

(22) Filed: Oct. 27, 2016

(65) Prior Publication Data
US 2017/0113560 A1    Apr. 27, 2017

(30) Foreign Application Priority Data
Oct. 27, 2015 (JP) .................................. 2015-211137

(51) Int. Cl.
*H02J 7/14* (2006.01)
*B60L 11/18* (2006.01)
(Continued)

(52) U.S. Cl.
CPC ........... *B60L 11/1872* (2013.01); *B60L 58/12* (2019.02); *B60L 58/20* (2019.02); *B60L 58/25* (2019.02);
(Continued)

(58) Field of Classification Search
None
See application file for complete search history.

(56) References Cited

U.S. PATENT DOCUMENTS

| 2014/0176046 A1* | 6/2014 | Park | H02J 7/0024 320/103 |
| 2014/0197798 A1* | 7/2014 | Hongo | H01M 10/44 320/134 |

(Continued)

FOREIGN PATENT DOCUMENTS

| JP | 2008-029171 | 2/2008 |
| JP | 2010-198837 | 9/2010 |

(Continued)

OTHER PUBLICATIONS

JP-2010198837 translation, power source system, Takemoto, Yuki, Sep. 2010 (Year: 2010).*

(Continued)

*Primary Examiner* — Robert Grant
*Assistant Examiner* — Tynese V McDaniel
(74) *Attorney, Agent, or Firm* — Mori & Ward, LLP

(57) ABSTRACT

A second energy storage has a second capacity deterioration factor which has a fluctuation with respect to a state of charge larger than a fluctuation of a first capacity deterioration factor. Circuitry is configured to control a converter to discharge one of the first energy storage and the second energy storage to charge another of the first energy storage and the second energy storage alternately when first temperature of the first energy storage and second temperature of the second energy storage are equal to or lower than a temperature threshold. The circuitry is configured to determine which of the first energy storage and the second energy storage is controlled to be discharged first based on the state of charge of the second energy storage, before the circuitry starts controlling the converter.

6 Claims, 9 Drawing Sheets

(51) Int. Cl.
    *B60L 58/12*     (2019.01)
    *H02J 7/16*     (2006.01)
    *B60L 58/25*     (2019.01)
    *B60L 58/20*     (2019.01)

(52) U.S. Cl.
    CPC .......... *H02J 7/1423* (2013.01); *H02J 7/1453* (2013.01); *H02J 7/166* (2013.01); *B60L 2240/545* (2013.01); *B60L 2240/547* (2013.01); *B60L 2240/549* (2013.01); *Y02T 10/7005* (2013.01); *Y02T 10/7044* (2013.01); *Y02T 10/7066* (2013.01)

(56) References Cited

U.S. PATENT DOCUMENTS

2015/0162771 A1* 6/2015 Monden ................ H02J 7/0054 320/103
2015/0191139 A1* 7/2015 Schindler .................. B60L 1/00 307/10.1
2016/0001660 A1* 1/2016 Tomura .................... H02J 1/00 307/10.1
2016/0236581 A1* 8/2016 Tashiro ................. H02J 7/0029

FOREIGN PATENT DOCUMENTS

| | | |
|---|---|---|
| JP | 2010198837 A * | 9/2010 |
| JP | 2014-238966 | 12/2014 |
| JP | 2015-125880 | 7/2015 |
| WO | WO 2013/146204 | 10/2013 |
| WO | WO 2015/137222 | 9/2015 |

OTHER PUBLICATIONS

Japanese Office Action for corresponding JP Application No. 2015-211137, dated Feb. 14, 2017.

Japanese Office Action for corresponding JP Application No. 2015-211137, dated May 16, 2017 (w/ English machine translation).

* cited by examiner

FIG. 7

| TEMPERATURE ES-E | TEMPERATURE ES-P | SOC ES-E | SOC ES-P | BATTERY WARM UP | VCU HIGH-LOSS CONTROL |
|---|---|---|---|---|---|
| HIGH | HIGH | HIGH | HIGH | NO | NO |
| HIGH | HIGH | HIGH | LOW | NO | NO |
| HIGH | HIGH | LOW | HIGH | NO | NO |
| HIGH | HIGH | LOW | LOW | NO | NO |
| HIGH | LOW | HIGH | HIGH | YES: POWER SUPPLY (ES-E→ES-P) | YES (WHEN MG DRIVEN) |
| HIGH | LOW | HIGH | LOW | YES: POWER SUPPLY (ES-E→ES-P) | NO |
| HIGH | LOW | LOW | HIGH | YES: POWER SUPPLY (ES-P→ES-E) | NO |
| HIGH | LOW | LOW | LOW | YES: POWER SUPPLY (ES-E→ES-P) | YES |
| LOW | HIGH | HIGH | HIGH | YES: POWER SUPPLY (ES-E→ES-P) | YES (WHEN MG DRIVEN) |
| LOW | HIGH | HIGH | LOW | YES: POWER SUPPLY (ES-E→ES-P) | NO |
| LOW | HIGH | LOW | HIGH | YES: POWER SUPPLY (ES-P→ES-E) | NO |
| LOW | HIGH | LOW | LOW | YES: POWER SUPPLY (ES-E→ES-P) | YES |
| LOW | LOW | HIGH | HIGH | NO | YES (WHEN MG DRIVEN) |
| LOW | LOW | HIGH | LOW | YES: ALTERNATE CHARGE/DISCHARGE (START WITH ES-P CHARGE) | YES |
| LOW | LOW | LOW | HIGH | YES: ALTERNATE CHARGE/DISCHARGE (START WITH ES-P CHARGE) | YES |
| LOW | LOW | LOW | LOW | YES: ALTERNATE CHARGE/DISCHARGE (START WITH ES-P CHARGE) | YES |

ENERGY STORAGE DEVICE, TRANSPORT APPARATUS, AND CONTROL METHOD

CROSS-REFERENCE TO RELATED APPLICATIONS

The present application claims priority under 35 U.S.C. § 119 to Japanese Patent Application No. 2015-211137, filed Oct. 27, 2015, entitled "Energy Storage Device, Transport Apparatus, and Control Method." The contents of this application are incorporated herein by reference in their entirety.

BACKGROUND

1. Field

The present disclosure relates to an energy storage device, a transport apparatus, and a control method.

2. Description of the Related Art

Japanese Unexamined Patent Application Publication No. 2014-238966 discloses a power supply device including a first energy storage unit constituted of a secondary battery, a chargeable second energy storage unit, a first charge/discharge circuit for charging the second energy storage unit with a voltage outputted by the first energy storage unit, a second charge/discharge circuit including a boost circuit and configured to charge the first energy storage unit by boosting a voltage outputted by the second energy storage unit, a temperature sensor that measures a temperature of the first energy storage unit, and a control unit that alternately causes, when the temperature of the first energy storage unit is lower than a predetermined value required for normal operation, the first charge/discharge circuit to transfer energy and the second charge/discharge circuit to transfer energy, until the temperature reaches the predetermined value.

SUMMARY

According to one aspect of the present invention, an energy storage device includes a first energy storage, a second energy storage, a converter, and circuitry. The first energy storage has a first capacity deterioration factor. The second energy storage has a second capacity deterioration factor which has a fluctuation with respect to a state of charge larger than a fluctuation of the first capacity deterioration factor. The converter is to convert at least one of a first voltage output from the first energy storage and a second voltage output from the second energy storage. The circuitry is configured to control the converter to discharge one of the first energy storage and the second energy storage to charge another of the first energy storage and the second energy storage alternately when first temperature of the first energy storage and second temperature of the second energy storage are equal to or lower than a temperature threshold. The circuitry is configured to determine which of the first energy storage and the second energy storage is controlled to be discharged first based on the state of charge of the second energy storage, before the circuitry starts controlling the converter.

According to another aspect of the present invention, in a control method for an energy storage device, first temperature of a first energy storage is detected. The first energy storage has a first capacity deterioration factor. Second temperature of a second energy storage is detected. The second energy storage has a second capacity deterioration factor which has a fluctuation with respect to a state of charge larger than a fluctuation of the first capacity deterioration factor. A converter is controlled to convert at least one of a first voltage output from the first energy storage and a second voltage output from the second energy storage to discharge one of the first energy storage and the second energy storage to charge another of the first energy storage and the second energy storage alternately when the first temperature and the second temperature are equal to or lower than a temperature threshold. Before the controlling the converter is started, which of the first energy storage and the second energy storage is controlled to be discharged first based on the state of charge of the second energy storage.

According to further aspect of the present invention, an energy storage device includes a first energy storage, a second energy storage, converting means, controlling means, and determining means. The first energy storage has a first capacity deterioration factor. The second energy storage has a second capacity deterioration factor which has a fluctuation with respect to a state of charge larger than a fluctuation of the first capacity deterioration factor. The converting means is for converting at least one of a first voltage output from the first energy storage and a second voltage output from the second energy storage. The controlling means is for controlling the converter to discharge one of the first energy storage and the second energy storage to charge another of the first energy storage and the second energy storage alternately when first temperature of the first energy storage and second temperature of the second energy storage are equal to or lower than a temperature threshold. The determining means is for determining which of the first energy storage and the second energy storage is controlled to be discharged first based on the state of charge of the second energy storage, before the circuitry starts controlling the converter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 7 is a table to be looked up by the ECU when deciding whether to perform the battery warm-up control.

DESCRIPTION OF THE EMBODIMENT

Figure 1:
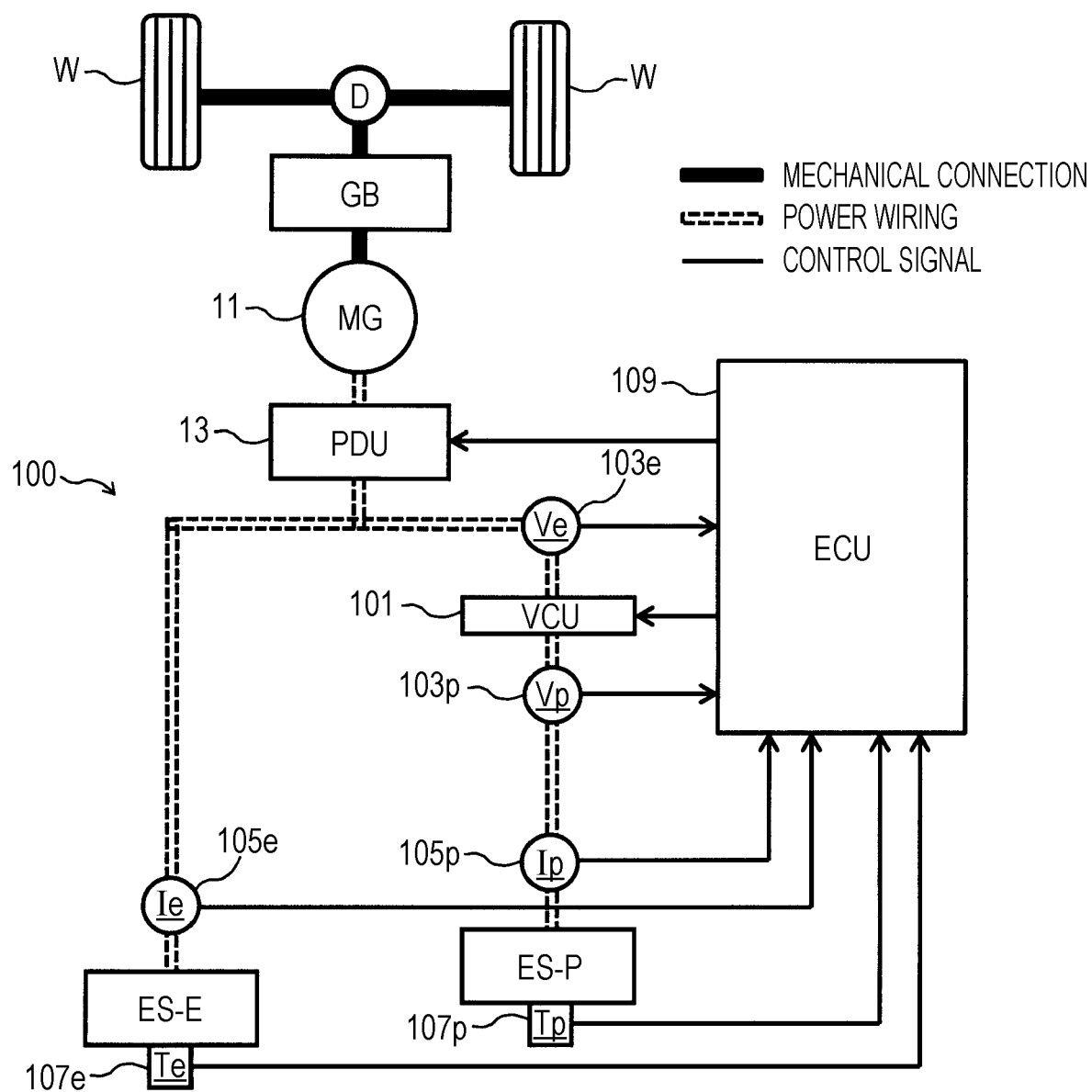
FIG. 1 is a schematic block diagram showing a general configuration of an electric vehicle including an energy storage device according to an embodiment of the present disclosure.

The embodiments will now be described with reference to the accompanying drawings, wherein like reference numerals designate corresponding or identical elements throughout the various drawings.

FIG. 1 is a schematic block diagram showing a general configuration of an electric vehicle including an energy storage device according to the embodiment of the present disclosure. In FIG. 1, bold solid lines represent mechanical connections, double broken lines represent power wirings, and solid-line arrows indicate flows of control signals. The 1MOT-type electric vehicle shown in FIG. 1 includes a motor generator (MG) 11, a power drive unit (PDU) 13, and the energy storage device 100 according to the embodiment. Elements of the electric vehicle will be described hereunder.

The motor generator 11 is driven by the power supplied from the energy storage device 100, to generate motive force that causes the electric vehicle to run. The torque generated by the motor generator 11 is transmitted to driving wheels W through a gear box GB including variable or fixed reduction gears and a differential gear D. When the electric vehicle is decelerated, the motor generator 11 acts as generator to output braking power to the electric vehicle. The regenerative power obtained upon causing the motor generator 11 to act as generator is stored in a battery included in the energy storage device 100.

The PDU 13 converts a DC voltage to an AC voltage and supplies a three-phase current to the motor generator 11. The PDU 13 also converts an AC voltage regenerated by the motor generator 11 into a DC voltage.

The energy storage device 100 includes, as shown in FIG. 1, a high-capacity battery ES-E, a high-output battery ES-P, a voltage control unit (VCU) 101, voltage sensors 103$p$, 103$e$, current sensors 105$p$, 105$e$, temperature sensors 107$p$, 107$e$, and an electronic control unit (ECU) 109.

The high-capacity battery ES-E includes a plurality of energy storage cells such as lithium ion batteries and nickel hydride batteries, and supplies high-voltage power to the motor generator 11. The high-output battery ES-P also includes a plurality of energy storage cells such as lithium ion batteries and nickel hydride batteries, and supplies high-voltage power to the motor generator 11 through the VCU 101. The high-output battery ES-P is connected to the PDU 13 via the VCU 101, parallel to the high-capacity battery ES-E. Generally, the voltage of the high-output battery ES-P is lower than that of the high-capacity battery ES-E. Accordingly, the power from the high-output battery ES-P is boosted by the VCU 101 to the same level as the voltage of the high-capacity battery ES-E, before being supplied to the motor generator 11 through the PDU 13.

The high-capacity battery ES-E and the high-output battery ES-P are not limited to the secondary battery such as the nickel hydride battery and the lithium ion battery. For example, a capacitor capable of storing and discharging a large amount of power in a short time, though with a limited storage capacity, may be employed as the high-output battery ES-P.

In addition, the high-capacity battery ES-E and the high-output battery ES-P have different characteristics from each other. The high-capacity battery ES-E is lower in output weight density but higher in energy weight density, than the high-output battery ES-P. Accordingly, the high-output battery ES-P is lower in energy weight density but higher in output weight density, than the high-capacity battery ES-E. Thus, the high-capacity battery ES-E is relatively superior in terms of energy weight density, while the high-output battery ES-P is relatively superior in terms of output weight density. Here, the energy weight density refers to an electric energy (Wh/kg) per unit weight, and the output weight density refers to an electric power (W/kg) per unit weight. Therefore, the high-capacity battery ES-E superior in energy weight density is an energy storage intended to store a larger amount, and the high-output battery ES-P superior in output weight density is an energy storage intended to output a higher power.

Such differences in characteristics between the high-capacity battery ES-E and the high-output battery ES-P originate from various parameters defined by, for example, the structure and materials of the elements of the battery such as the electrode, active material, and electrolytic material/solution. For example, in terms of chargeable capacity, which is a parameter indicating a total amount of energy that can be stored and discharged, the high-capacity battery ES-E is superior to the high-output battery ES-P. In contrast, in terms of C rate characteristic which is a parameter indicating deterioration resistance of the chargeable amount against charging and discharging cycles, or internal resistance (impedance) which is a parameter indicating resistance in the charging and discharging, the high-output battery ES-P is superior to the high-capacity battery ES-E.

Figure 2:
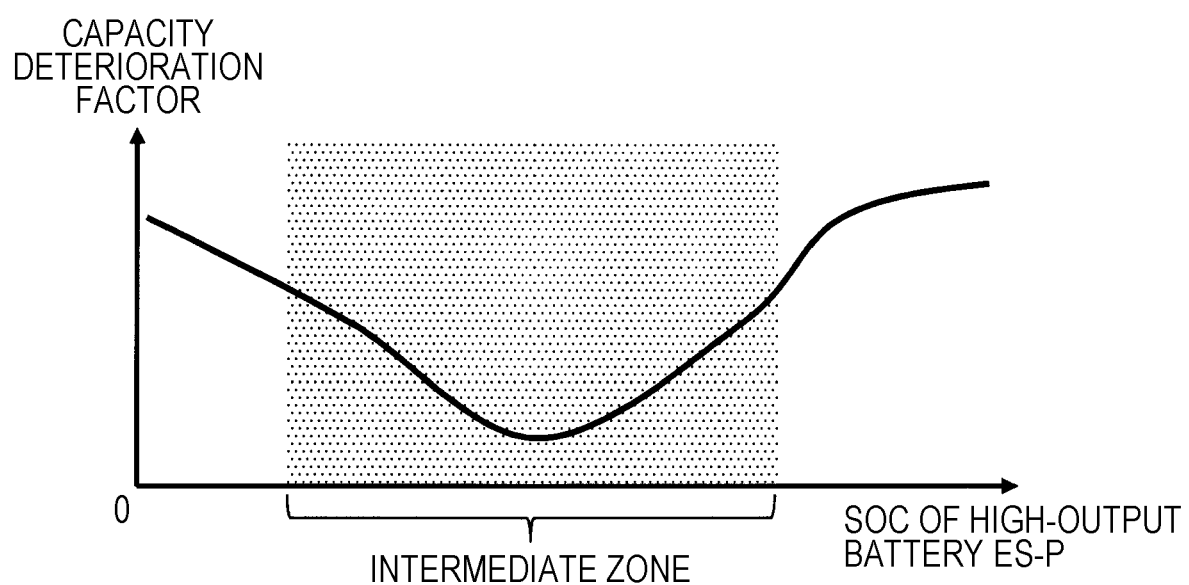
FIG. 2 is a graph representing a capacity deterioration factor with respect to a SOC of a high-output battery.

Further, in the high-capacity battery ES-E the capacity deterioration factor does not fluctuate much depending on the state of charge (SOC), also referred to as residual charge, and the full-charge voltage and discharge final voltage do not remarkably deteriorate either. In contrast, as shown in FIG. 2 the capacity deterioration factor of the high-output battery ES-P largely fluctuates with respect to the SOC. More specifically, although the capacity deterioration factor is lower with respect to the SOC in an intermediate zone, the capacity deterioration factor significantly increases outside the intermediate zone. In addition, between the zones of the SOC higher and lower than the intermediate zone of the high-output battery ES-P, the capacity deterioration factor increases at a higher rate in the zone higher than the intermediate zone, as the SOC deviates from the intermediate zone.

Figure 3:
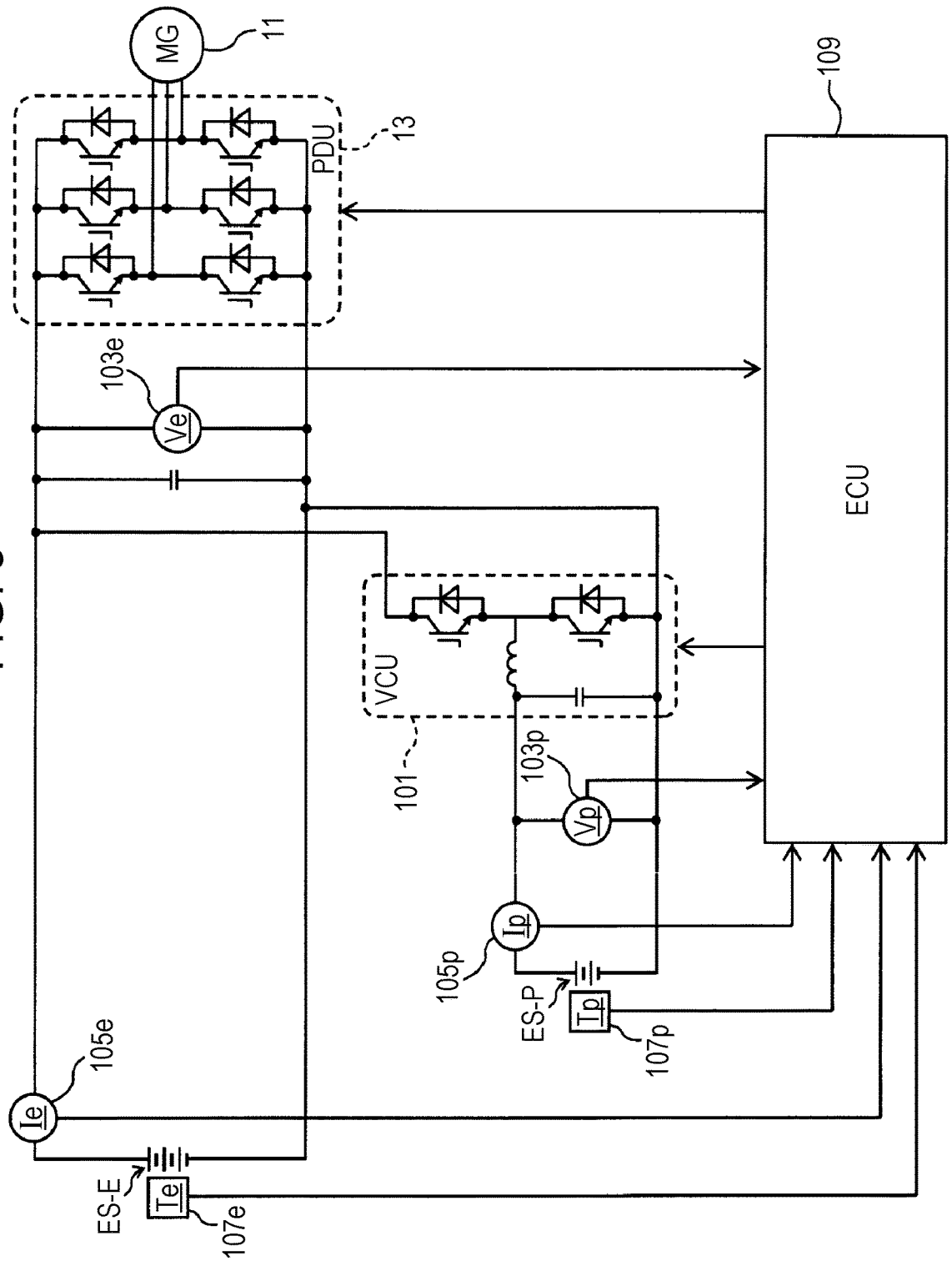
FIG. 3 is a circuit diagram showing an arrangement of a high-capacity battery, a high-output battery, a VCU, a PDU, and a motor generator.

The VCU 101 boosts the DC output voltage of the high-output battery ES-P as it is. The VCU 101 also bucks the power generated by the motor generator 11 when the electric vehicle is decelerated, and converted into DC. In addition, the VCU 101 bucks the DC output voltage of the high-capacity battery ES-E as it is. The power bucked by the VCU 101 is charged to the high-output battery ES-P. FIG. 3 is a circuit diagram showing an arrangement of the high-capacity battery ES-E, the high-output battery ES-P, the VCU 101, the PDU 13, and the motor generator 11. As shown in FIG. 3, the VCU 101 receives the output voltage of the high-output battery ES-P and turns on and off two switching elements, so as to boost the voltage of the high-output battery ES-P, and outputs the boosted voltage.

The voltage sensor 103$p$ detects a voltage Vp of the high-output battery ES-P. The signal indicating the voltage Vp detected by the voltage sensor 103$p$ is transmitted to the ECU 109. The voltage sensor 103$e$ detects a voltage Ve of the high-capacity battery ES-E. The voltage Ve detected by the voltage sensor 103$e$ is equal to the voltage boosted by the VCU 101 from the voltage Vp of the high-output battery ES-P. The signal indicating the voltage Ve detected by the voltage sensor 103$e$ is transmitted to the ECU 109.

The current sensor 105p detects an input/output current Ip of the high-output battery ES-P. The signal indicating the input/output current Ip detected by the current sensor 105p is transmitted to the ECU 109. The current sensor 105e detects an input/output current Ie of the high-capacity battery ES-E. The signal indicating the input/output current Ie detected by the current sensor 105e is transmitted to the ECU 109.

The temperature sensor 107p detects a temperature Tp of the high-output battery ES-P. The signal indicating the temperature Tp detected by the temperature sensor 107p is transmitted to the ECU 109. The temperature sensor 107e detects a temperature Te of the high-capacity battery ES-E. The signal indicating the temperature Te detected by the temperature sensor 107e is transmitted to the ECU 109.

The ECU 109 controls the PDU 13 and the VCU 101. The ECU 109 also leads out the respective SOC of the high-capacity battery ES-E and the high-output battery ES-P, on the basis of the voltages detected by the voltage sensors 103p, 103e and the input/output currents detected by the current sensors 105p, 105e, through current integration and/or open circuit voltage (OCV) estimation.

The ECU 109 also controls power distribution through the VCU 101, so as to make the most of the characteristics of the high-capacity battery ES-E and the high-output battery ES-P, which are different from each other. Through the power distribution control, the high-capacity battery ES-E can supply a certain amount of power to the motor generator 11 while the electric vehicle is running, and the high-output battery ES-P can supply power to the motor generator 11 when a large driving force is required to allow the electric vehicle to run. The regenerative power generated by the motor generator 11 is inputted with preference to the high-output battery ES-P. Accordingly, generally the overall zone from 0% to 100% of the SOC of the high-capacity battery ES-E is regarded as workable range, and the SOC continuously falls while the electric vehicle is running. In contrast, the intermediate zone of the SOC, approximately between 40% and 70% is regarded as workable range of the high-output battery ES-P, and the SOC is made to vary so as to remain in the proximity of a predetermined intermediate value within the intermediate zone.

Figure 4:
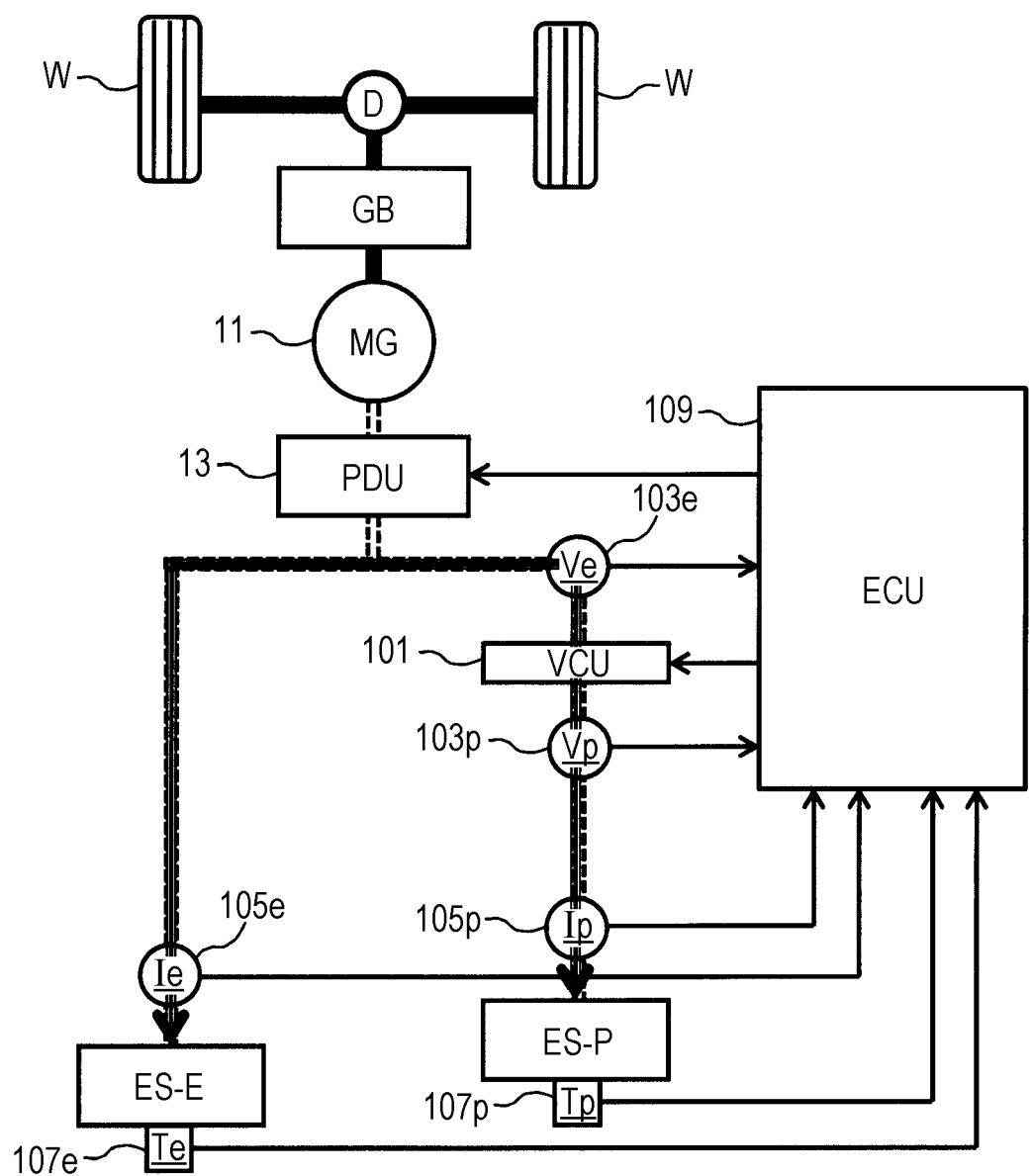
FIG. 4 is a schematic diagram showing a flow of charge and discharge current between the high-capacity battery and the high-output battery during an alternate charge/discharge.

Further, the ECU 109 controls the VCU 101 so as to execute "power supply" including supplying power from one battery to another to thereby warm up the battery, when the temperature Te of the high-capacity battery ES-E or the temperature Tp of the high-output battery ES-P is lower than a threshold. In particular, when the temperature Te of the high-capacity battery ES-E and the temperature Tp of the high-output battery ES-P are both lower than the threshold, the ECU 109 controls the VCU 101 so as to execute "alternate charge/discharge" shown in FIG. 4, including causing the high-capacity battery ES-E and the high-output battery ES-P to alternately charge and discharge to thereby warm up the batteries. Hereinafter, the control performed by the ECU 109 to warm up the battery will be referred to as "battery warm-up control".

Figure 5:
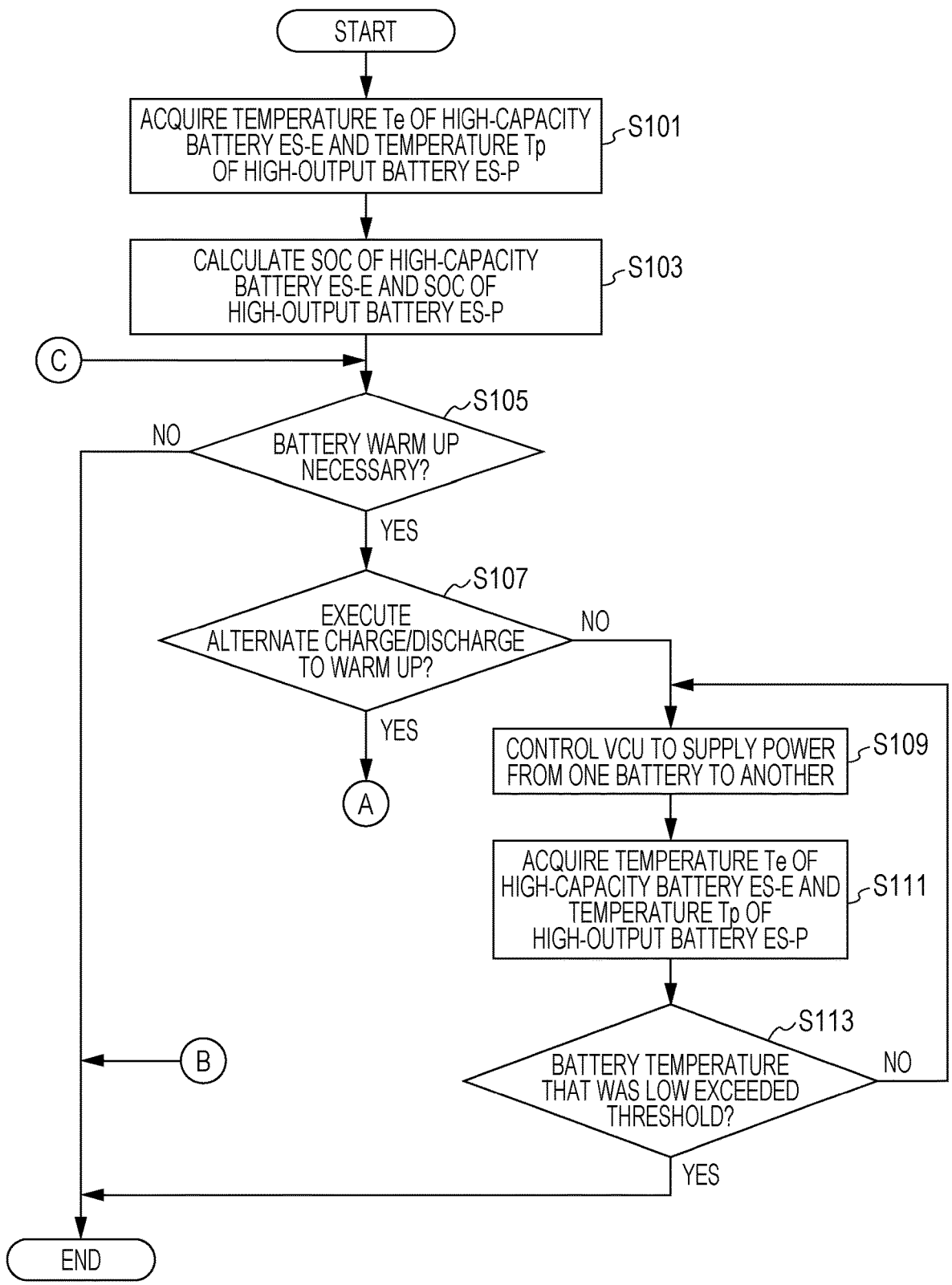
FIG. 5 is a flowchart showing a battery warm-up process performed by an ECU.
Figure 6:
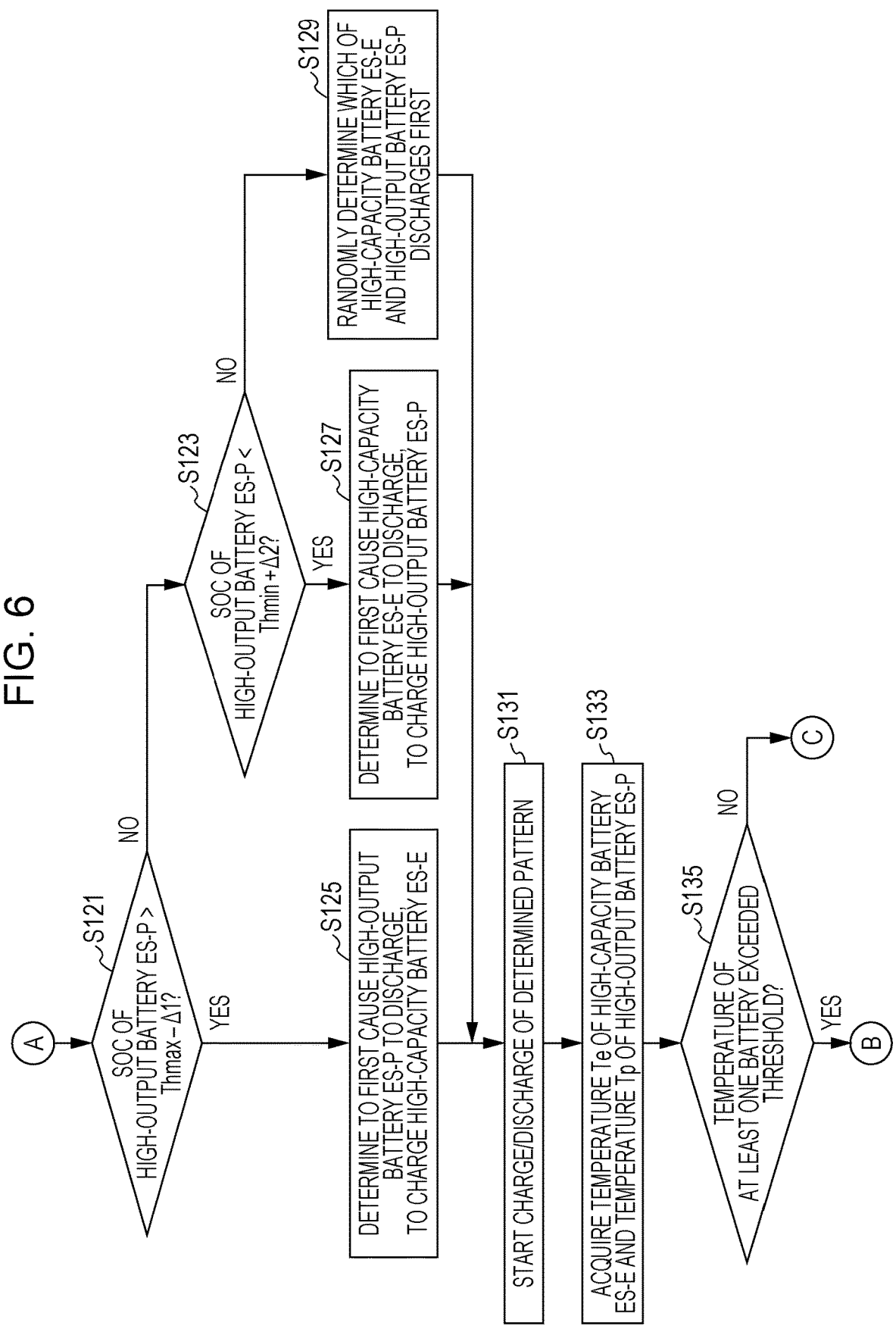
FIG. 6 is another flowchart showing the battery warm-up process performed by the ECU.

Referring now to FIG. 5 and FIG. 6, the details of the battery warm-up control performed by the ECU 109 will be described hereunder. FIG. 5 and FIG. 6 are flowcharts showing the battery warm-up process performed by the ECU 109. As shown in FIG. 5, the ECU 109 acquires the temperature Te of the high-capacity battery ES-E detected by the temperature sensor 107e, and the temperature Tp of the high-output battery ES-P detected by the temperature sensor 107p (step S101). Then the ECU 109 calculates the respective SOC of the high-capacity battery ES-E and the high-output battery ES-P (step S103).

The ECU 109 then decides whether to perform the battery warm-up control on the basis of the information acquired at step S101 and step S103, and according to a table shown in FIG. 7 (step S105), and proceeds to step S107 when the battery warm-up control is performed, but finishes the operation when the battery warm-up control is not performed. The temperatures of the high-capacity battery ES-E and the high-output battery ES-P shown in the table of FIG. 7 are indicated as "high" when the temperature is higher than the threshold, and as "low" when the temperature is equal to or lower than the threshold. The SOC of the high-output battery ES-P shown in FIG. 7 is indicated as "high" when the SOC is higher than a value obtained by subtracting a first margin from the maximum value of a preferable zone to be subsequently described, and as "low" when the SOC is equal to or lower than a value obtained by adding a second margin to the minimum value of the preferable zone. In addition, in FIG. 7 the SOC of the high-capacity battery ES-E is indicated as "high" for example when the SOC is higher than 80%, and as "low" when the SOC is lower than 20%.

At step S107, the ECU 109 decides whether to perform the battery warm-up control by alternate charge/discharge, on the basis of the information acquired at step S101 and step S103 and according to the table shown in FIG. 7, and proceeds to step S121 of FIG. 6 when the alternate charge/discharge is performed, and to step S109 when the alternate charge/discharge is not performed. According to the table of FIG. 7, except when the SOC of the high-capacity battery ES-E and the high-output battery ES-P are both "high", the battery warm-up control by alternate charge/discharge is to be performed when the temperatures of the high-capacity battery ES-E and the high-output battery ES-P are both "low", and the battery warm-up control by power supply is to be performed when either temperature of the high-capacity battery ES-E or the high-output battery ES-P is "low".

At step S109, the ECU 109 controls the VCU 101 so as to supply power from one of the high-capacity battery ES-E and the high-output battery ES-P to the other, to warm up the battery. Then the ECU 109 acquires the temperature Te of the high-capacity battery ES-E detected by the temperature sensor 107e and the temperature Tp of the high-output battery ES-P detected by the temperature sensor 107p (step S111). The ECU 109 then decides, according to the information acquired at step S111, whether the battery temperature which was "low" when step S101 was executed has exceeded the threshold thus to become "high" (step S113), and finishes the operation when the battery temperature is "high", and returns to step S109 when the battery temperature is "low", i.e., equal to or lower than the threshold.

Figure 8:
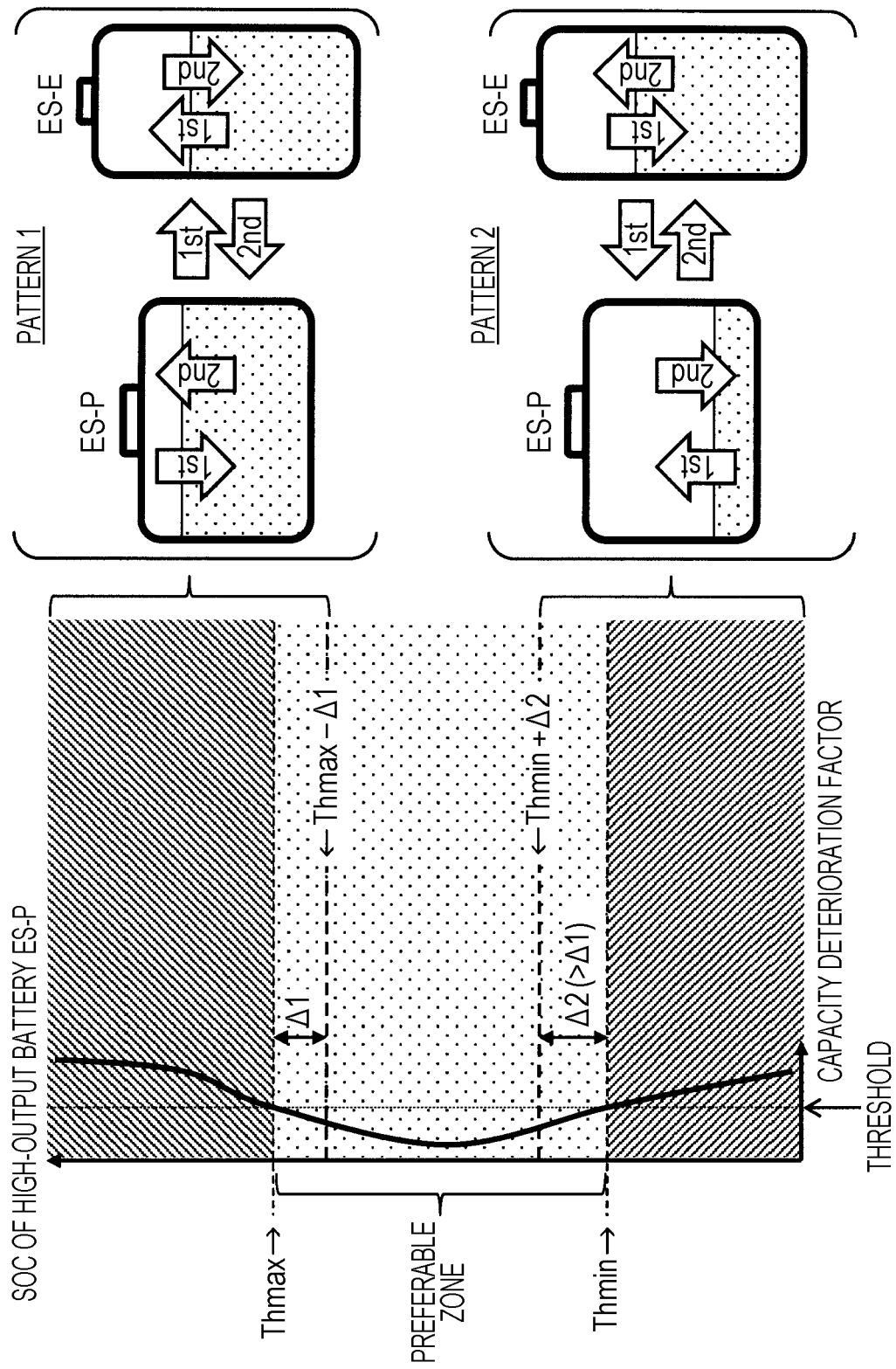
FIG. 8 is a schematic drawing showing a preferable zone of the SOC of the high-output battery and patterns of the alternate charge/discharge.

The process subsequent to step S121, to be followed when it is decided at step S107 that the alternate charge/discharge is to be performed, is shown in FIG. 6. At step S121, the ECU 109 decides whether the SOC of the high-output battery ES-P (SOCp) is higher than a value obtained by subtracting a first margin Δ1 from the maximum value Thmax of the preferable zone (SOCp>Thmax−Δ1). Here, the preferable zone refers to a range of the SOC in which the capacity deterioration factor of the high-output battery ES-P with respect to the SOC stays equal to or lower than a threshold and, as shown in FIG. 8, the preferable zone of the SOC of the high-output battery ES-P generally agrees with the intermediate zone. Upon deciding as SOCp>Thmax−Δ1 at step S121 the ECU 109 proceeds to step S125, and upon deciding as SOCp≤Thmax−Δ1 the ECU 109 proceeds to step S123. At step S123, the ECU 109 decides whether the SOC of the high-output battery ES-P (SOCp) is lower than a value obtained by adding a second margin Δ2 to the minimum value Thmin of the preferable zone (SOCp<Thmin+Δ2). Upon deciding as SOCp<Thmin+Δ2 the ECU 109 proceeds to step S127, and upon deciding as SOCp≥Thmin+Δ2 the ECU 109 proceeds to step S129. The capacity deterioration factor of the high-output battery ES-P increases at a lower rate on the side of the minimum value Thmin of the preferable zone, where the SOC decreases from the intermediate zone, than on the side of the maximum value Thmax. Therefore, the second margin Δ2 is smaller than the first margin Δ1. However, when a battery having such a characteristic that the capacity deterioration factor increases at a higher rate on the side of the minimum value Thmin of the preferable zone, than on the side of the maximum value Thmax, is employed in place of the high-output battery ES-P, it is preferable to set the second margin Δ2 to a larger value than the first margin Δ1.

At step S125, the ECU 109 decides, when starting the alternate charge/discharge, to cause the high-output battery ES-P to discharge first, so as to charge the high-capacity battery ES-E. In other words, the ECU 109 decides that the alternate charge/discharge of a pattern 1 shown in FIG. 8 is to be performed. At step S127, the ECU 109 decides, when starting the alternate charge/discharge, to cause the high-capacity battery ES-E to discharge first, so as to charge the high-output battery ES-P. In other words, the ECU 109 decides that the alternate charge/discharge of a pattern 2 shown in FIG. 8 is to be performed. At step S129, in addition, the ECU 109 randomly decides, when starting the alternate charge/discharge, which of the high-capacity battery ES-E and the high-output battery ES-P is to be caused to discharge. In other words, the ECU 109 randomly decides which of the pattern 1 and the pattern 2 is to be adopted to perform the alternate charge/discharge.

After steps S125, S127, or S129, the ECU 109 controls the VCU 101 to start the alternate charge/discharge in the selected pattern (step S131). Thereafter, the ECU 109 acquires the temperature Te of the high-capacity battery ES-E detected by the temperature sensor 107e and the temperature Tp of the high-output battery ES-P detected by the temperature sensor 107p (step S133). The ECU 109 then decides whether the temperature of at least one of the high-capacity battery ES-E and the high-output battery ES-P has exceeded the threshold thus to become "high", according to the information acquired at step S133 (step S135), and finishes the operation when the temperature of at least one of the batteries is "high", but returns to step S105 when the temperature of neither of the batteries is "low", i.e., lower than the threshold. Since the temperatures of the both batteries are "low", i.e., lower than the threshold when the operation is returned to step S105, the ECU 109 proceeds to step S121 in accordance with the table of FIG. 7, and controls the VCU 101 so as to perform the alternate charge/discharge of the high-capacity battery ES-E and the high-output battery ES-P.

In the foregoing process, when the temperature of at least one of the batteries are "high" at step 135, the ECU 109 finishes the operation. Alternatively, the ECU 109 may return to step S105. In this case, when the temperature of only one of the batteries is "high" the ECU 109 may decide to perform the battery warm-up control at step S105, decide not to perform the alternate charge/discharge at step S107, and control the VCU 101 at step S109 so as to supply power from one of the high-capacity battery ES-E and the high-output battery ES-P to the other.

When executing the battery warm-up control, the ECU 109 may perform a VCU high-loss control shown in FIG. 7, in which the conversion efficiency of the VCU 101 is lowered. Lowering the conversion efficiency of the VCU 101 leads to an increase in calorific value generated in the VCU 101, and therefore the heat generated in the VCU 101 can also be utilized to increase the temperature of the batteries, in addition to the warm-up operation through the alternate charge/discharge. Therefore, the warm-up efficiency can be improved, which leads to reduction in number of execution times of the alternate charge/discharge, and consequently the deterioration of the first energy storage can also be minimized, not only the deterioration of the second energy storage.

As described thus far, according to this embodiment, when the respective temperatures of the high-capacity battery ES-E and the high-output battery ES-P are equal to or lower than the threshold, the pattern of the alternate charge/discharge is determined according to the SOC of the high-output battery ES-P, so as to prevent the SOC of the high-output battery ES-P from reaching a level where the capacity deterioration factor becomes higher, owing to the alternate charge/discharge performed to warm up the batteries. Regarding the pattern of the alternate charge/discharge, when the SOC of the high-output battery ES-P exceeds the value obtained by subtracting the first margin Δ1 from the maximum value Thmax of the preferable zone, the high-output battery ES-P is caused to discharge first so as to lower the SOC thereof at the start of the alternate charge/discharge, because the capacity deterioration factor of the high-output battery ES-P is likely to exceed the threshold with a further increase in SOC of the high-output battery ES-P. Such an arrangement prevents the capacity deterioration factor of the second energy storage from exceeding the threshold. In addition, when the SOC of the high-output battery ES-P is higher than the value obtained by adding the second margin Δ2 to the minimum value Thmin of the preferable zone, the high-output battery ES-P is charged first so as to increase the SOC thereof at the start of the alternate charge/discharge, because the capacity deterioration factor of the high-output battery ES-P is likely to exceed the threshold with a further decrease in SOC of the high-output battery ES-P. Such an arrangement prevents the capacity deterioration factor of the second energy storage from exceeding the threshold. Therefore, the high-capacity battery ES-E and the high-output battery ES-P can be warmed up, while preventing the deterioration of the high-output battery ES-P.

When the first margin Δ1 is zero, the capacity deterioration factor of the high-output battery ES-P can be suppressed by causing the high-output battery ES-P to discharge first so as to lower the SOC thereof at the start of the alternate charge/discharge, because the capacity deterioration factor of the high-output battery ES-P becomes higher when the SOC exceeds the maximum value Thmax of the preferable zone. Likewise, when the second margin Δ2 is zero, the capacity deterioration factor of the high-output battery ES-P can be suppressed by charging the high-output battery ES-P first so as to increase the SOC thereof at the start of the alternate charge/discharge, because the capacity deterioration factor of the high-output battery ES-P becomes higher when the SOC is lower than the minimum value Thmin of the preferable zone. Therefore, the high-capacity battery ES-E and the high-output battery ES-P can be warmed up, while preventing the deterioration of the high-output battery ES-P.

In addition, setting the second margin Δ2 on the side of the minimum value Thmin of the preferable zone of the SOC of the high-output battery ES-P to a larger value than the first margin Δ1 on the side of the maximum value Thmax of the preferable zone makes the SOC of the high-output battery ES-P less likely to drop to the minimum value Thmin of the preferable zone, thereby more effectively preventing the capacity deterioration factor of the high-output battery ES-P from exceeding the threshold. Here, when a battery, having such a characteristic that the second margin Δ2 on the side of the minimum value Thmin of the preferable zone of the SOC is larger than the first margin Δ1 on the side of the maximum value Thmax of the preferable zone, is employed in place of the high-output battery ES-P, the SOC can be more effectively prevented from dropping below the minimum value Thmin of the preferable zone since the second margin Δ2 on the side of the minimum value Thmin of the preferable zone is larger than the first margin Δ1 on the side of the maximum value Thmax of the preferable zone. Therefore, the deterioration of the battery can be more effectively prevented, particularly when the capacity deterioration factor of the battery is higher in a low zone of the SOC.

The present disclosure is not limited to the foregoing embodiment, but may be modified or improved in various manners. For example, although the 1MOT type electric vehicle (EV) is adopted as example in the embodiment, the present disclosure is equally applicable to an EV including a plurality of motor generators, a hybrid electrical vehicle (HEV) or a plug-in hybrid electrical vehicle (PHEV) including an internal combustion engine with at least one motor generator, and a fuel cell vehicle (FCV).

Figure 9:
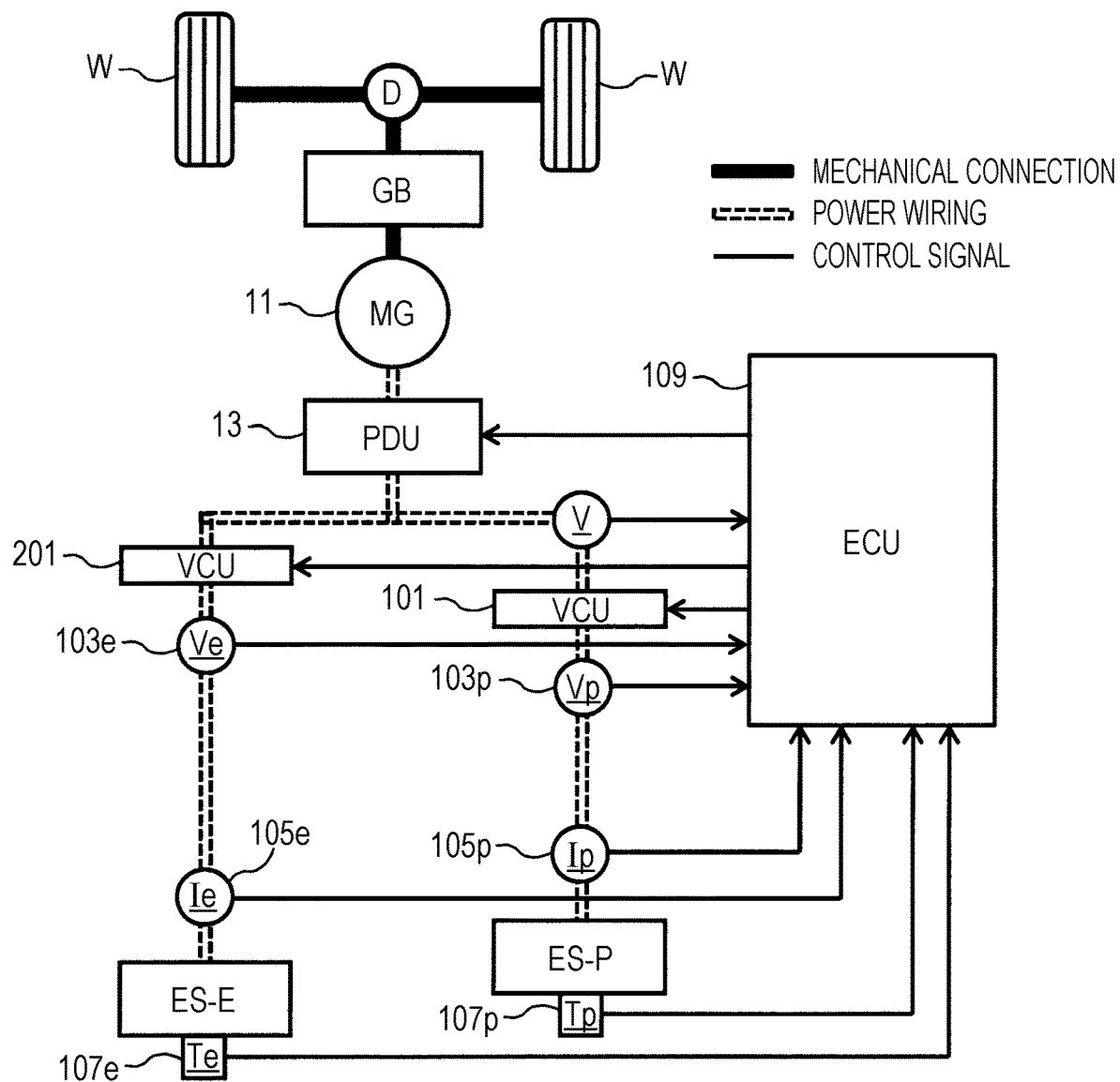
FIG. 9 is a schematic block diagram showing a general configuration of an electric vehicle including an energy storage device according to another embodiment.

Although the VCU 101 according to the foregoing embodiment is configured to boost the voltage Vp of the high-output battery ES-P, a VCU that bucks the voltage Vp of the high-output battery ES-P may be employed when the voltage Ve of the high-capacity battery ES-E is lower than the voltage Vp of the high-output battery ES-P. Alternatively, a bidirectional boost/buck VCU may be employed. In addition, a VCU201 may be provided on the side of the high-capacity battery ES-E, as shown in FIG. 9. Because of the presence of the two VCUs, the voltage applied to the motor generator 11 and the PDU 13 is no longer restricted by the high-capacity battery ES-E, and therefore the operation efficiency can be improved.

In a first aspect, the present disclosure provides an energy storage device including a first energy storage (e.g., high-capacity battery ES-E according to an embodiment), a second energy storage (e.g., high-output battery ES-P according to the embodiment) having a capacity deterioration factor more dependent on a state of charge than a capacity deterioration factor of the first energy storage, a conversion unit (e.g., VCU 101, 201 according to the embodiment) that converts at least one of an output voltage of the first energy storage and an output voltage of the second energy storage, and a control unit (e.g., ECU 109 according to the embodiment) that controls the conversion unit. The control unit controls the conversion unit so as to execute an alternate charge/discharge between the first energy storage and the second energy storage when respective temperatures of the first energy storage and the second energy storage are equal to or lower than a threshold, and determines, when starting the alternate charge/discharge, which of the first energy storage and the second energy storage is to be first caused to discharge, according to the state of charge of the second energy storage.

With the configuration according to the first aspect, as well as an eleventh and twelfth aspects to be subsequently described, the second energy storage is either caused to discharge first or charged first, depending on the state of charge thereof, so as to prevent the capacity deterioration factor of the second energy storage from becoming higher owing to the alternate charge/discharge performed to warm up the first energy storage and the second energy storage, since the capacity deterioration factor of the second energy storage depends more largely on the state of charge. Therefore, the first energy storage and the second energy storage can be warmed up, while preventing the deterioration of the second energy storage.

In a second aspect, the control unit of the energy storage device according to the first aspect may control the conversion unit, when starting the alternate charge/discharge, to first cause the second energy storage to discharge so as to charge the first energy storage, when the state of charge of the second energy storage is higher than a preferable zone in which the capacity deterioration factor of the second energy storage is equal to or lower than a threshold.

With the arrangement according to the second aspect, the second energy storage is caused to discharge first so as to lower the state of charge of the second energy storage, at the start of the alternate charge/discharge, since the capacity deterioration factor of the second energy storage is likely to become higher when the state of charge exceeds the preferable zone. Therefore, the capacity deterioration factor of the second energy storage can be suppressed.

In a third aspect, the control unit of the energy storage device according to the first or second aspect may control the conversion unit, when starting the alternate charge/discharge, to first cause the first energy storage to discharge so as to charge the second energy storage, when the state of charge of the second energy storage is lower than the preferable zone in which the capacity deterioration factor of the second energy storage is equal to or lower than a threshold.

With the arrangement according to the third aspect, the second energy storage is charged first so as to increase the state of charge of the second energy storage, at the start of the alternate charge/discharge, since the capacity deterioration factor of the second energy storage is likely to become higher when the state of charge is lower than the preferable zone. Therefore, the capacity deterioration factor of the second energy storage can be suppressed.

In a fourth aspect, the control unit of the energy storage device according to the second or third aspect may control the conversion unit, when starting the alternate charge/discharge, to first cause the second energy storage to discharge so as to charge the first energy storage, when the state of charge of the second energy storage is higher than a value obtained by subtracting a first margin from a maximum value of the preferable zone.

With the arrangement according to the fourth aspect, when the state of charge of the second energy storage exceeds the value obtained by subtracting the first margin from the maximum value of the preferable zone, the second energy storage is caused to discharge first so as to lower the state of charge thereof at the start of the alternate charge/discharge, because the capacity deterioration factor of the second energy storage is likely to exceed the threshold with a further increase in state of charge of the second energy storage. Therefore, the capacity deterioration factor of the second energy storage can be prevented from exceeding the threshold.

In a fifth aspect, the control unit of the energy storage device according to the second or third aspect may control the conversion unit, when starting the alternate charge/discharge, to first cause the first energy storage to discharge so as to charge the second energy storage, when the state of charge of the second energy storage is lower than a value obtained by adding a second margin to a minimum value of the preferable zone.

In a sixth aspect, the control unit of the energy storage device according to the fourth aspect may control the conversion unit, when starting the alternate charge/discharge, to first cause the first energy storage to discharge so as to charge the second energy storage, when the state of charge of the second energy storage is lower than a value obtained by adding a second margin to a minimum value of the preferable zone.

With the arrangement according to the fifth and sixth aspects, when the state of charge of the second energy storage is lower than the value obtained by adding the second margin to the minimum value of the preferable zone, the second energy storage is charged first so as to increase the state of charge thereof at the start of the alternate charge/discharge, because the capacity deterioration factor of the second energy storage is likely to exceed the threshold with a further decrease in state of charge of the second energy storage. Therefore, the capacity deterioration factor of the second energy storage can be prevented from exceeding the threshold.

In a seventh aspect, the second margin according to the sixth aspect may be smaller than the first margin.

With the configuration according to the seventh aspect, the state of charge of the second energy storage can be made less likely to exceed the maximum value of the preferable zone, by setting the second margin on the side of the minimum value of the preferable zone of the state of charge of the second energy storage to a smaller value than the first margin on the side of the maximum value. Therefore, the deterioration of the second energy storage can be more effectively prevented, particularly when the capacity deterioration factor of the second energy storage is higher in a high zone of the state of charge.

In an eighth aspect, the second margin according to the sixth aspect may be larger than the first margin.

With the configuration according to the eighth aspect, the state of charge can be made less likely to become lower than the minimum value of the preferable zone of the state of charge, by setting the second margin on the side of the minimum value of the preferable zone to a larger value than the first margin on the side of the maximum value, for example when an energy storage, having such a characteristic that the capacity deterioration factor increases at a higher rate on the side of the minimum value of the preferable zone of the state of charge than on the side of the maximum value, is employed in place of the second energy storage. Therefore, the deterioration of such an energy storage can be more effectively prevented, particularly when the capacity deterioration factor of the energy storage is higher in a low zone of the state of charge.

In a ninth aspect, the control unit of the energy storage device according to any one of the first to the eighth aspects may control the conversion unit, when executing the alternate charge/discharge, so as to lower conversion efficiency of the conversion unit compared with when the alternate charge/discharge is not executed.

With the arrangement according to the ninth aspect, the heat generated in the conversion unit can also be utilized to increase the temperature of the energy storage, in addition to the warm-up operation for the energy storage through the alternate charge/discharge, because lowering the conversion efficiency of the conversion unit during the alternate charge/discharge leads to an increase in calorific value generated in the conversion unit.

In a tenth aspect, the second energy storage of the energy storage device according to any one of the first to the ninth aspects may be superior in output weight density and inferior in energy weight density, to the first energy storage.

The configuration according to the tenth aspect enables, in the energy storage device that employs a combination of two energy storages of different characteristics, both of the energy storages to be warmed up while suppressing the deterioration of the second energy storage. Therefore, the warm-up efficiency can be improved, which leads to reduction in number of execution times of the alternate charge/discharge, and consequently the deterioration of the first energy storage can also be minimized, not only the deterioration of the second energy storage.

In an eleventh aspect, the present disclosure provides a transport apparatus including the energy storage device according to any one of the first to the tenth aspects.

In a twelfth aspect, the present disclosure provides a control method to be executed by an energy storage device including a first energy storage (e.g., high-capacity battery ES-E according to an embodiment), a second energy storage (e.g., high-output battery ES-P according to the embodiment) having a capacity deterioration factor more dependent on a state of charge than a capacity deterioration factor of the first energy storage, a conversion unit (e.g., VCU 101, 201 according to the embodiment) that converts at least one of an output voltage of the first energy storage and an output voltage of the second energy storage, and a control unit (e.g., ECU 109 according to the embodiment) that controls the conversion unit. The control method includes causing the control unit to control the conversion unit so as to execute an alternate charge/discharge between the first energy storage and the second energy storage when respective temperatures of the first energy storage and the second energy storage are equal to or lower than a threshold, and to determine, when starting the alternate charge/discharge, which of the first energy storage and the second energy storage is to be first caused to discharge, according to the state of charge of the second energy storage.

Obviously, numerous modifications and variations of the present invention are possible in light of the above teachings. It is therefore to be understood that within the scope of the appended claims, the invention may be practiced otherwise than as specifically described herein.

What is claimed is:

1. An energy storage device comprising:
a first energy storage having a first capacity deterioration factor;
a second energy storage having a second capacity deterioration factor which has a fluctuation with respect to a state of charge larger than a fluctuation of the first capacity deterioration factor;
a converter to convert at least one of a first voltage output from the first energy storage and a second voltage output from the second energy storage;
circuitry configured to:
control the converter to discharge one of the first energy storage and the second energy storage to charge another of the first energy storage and the second energy storage alternately when first temperature of the first energy storage and second temperature of the second energy storage are equal to or lower than a temperature threshold;

determine which of the first energy storage and the second energy storage is controlled to be discharged first based on the state of charge of the second energy storage, before the circuitry starts controlling the converter; and perform a high-loss control of the first energy storage and the second energy storage, in which a conversion efficiency of the converter is lowered, wherein the circuitry controls the converter to discharge the second energy storage first to charge the first energy storage, when the state of charge of the second energy storage is higher than a preferable zone in which the second capacity deterioration factor of the second energy storage is equal to or lower than a factor threshold, wherein the circuitry controls the converter to discharge the first energy storage first to charge the second energy storage, when the state of charge of the second energy storage is lower than the preferable zone in which the second capacity deterioration factor of the second energy storage is equal to or lower than the factor threshold, wherein the circuitry controls the converter to discharge the second energy storage first to charge the first energy storage, when the state of charge of the second energy storage is higher than a value obtained by subtracting a first margin from a maximum value of the preferable zone, wherein the circuitry controls the converter to discharge the first energy storage first to charge the second energy storage, when the state of charge of the second energy storage is lower than a value obtained by adding a second margin to a minimum value of the preferable zone, and wherein the second margin is larger than the first margin.

2. The energy storage device according to claim 1, wherein, when the one of the first energy storage and the second energy storage is alternately discharged to charge the another of the first energy storage and the second energy storage, the circuitry controls the converter to lower conversion efficiency of the converter compared with conversion efficiency of the converter when the one of the first energy storage and the second energy storage is not alternately discharged to charge the another of the first energy storage and the second energy storage.

3. The energy storage device according to claim 1, wherein the second energy storage is superior in output weight density and inferior in energy weight density, to the first energy storage.

4. A transport apparatus comprising the energy storage device according to claim 1.

5. A control method for an energy storage device, comprising:

detecting first temperature of a first energy storage having a first capacity deterioration factor;

detecting second temperature of a second energy storage having a second capacity deterioration factor which has a fluctuation with respect to a state of charge larger than a fluctuation of the first capacity deterioration factor;

controlling a converter to convert at least one of a first voltage output from the first energy storage and a second voltage output from the second energy storage to discharge one of the first energy storage and the second energy storage to charge another of the first energy storage and the second energy storage alternately when the first temperature and the second temperature are equal to or lower than a temperature threshold;

determining which of the first energy storage and the second energy storage is controlled to be discharged first based on the state of charge of the second energy storage, before the controlling the converter is started; and performing a high-loss control of the first energy storage and the second energy storage, in which a conversion efficiency of the converter is lowered, wherein the converter is controlled to discharge the second energy storage first to charge the first energy storage, when the state of charge of the second energy storage is higher than a preferable zone in which the second capacity deterioration factor of the second energy storage is equal to or lower than a factor threshold, wherein the converter is controlled to discharge the first energy storage first to charge the second energy storage, when the state of charge of the second energy storage is lower than the preferable zone in which the second capacity deterioration factor of the second energy storage is equal to or lower than the factor threshold, wherein the converter is controlled to discharge the second energy storage first to charge the first energy storage, when the state of charge of the second energy storage is higher than a value obtained by subtracting a first margin from a maximum value of the preferable zone, wherein the converter is controlled to discharge the first energy storage first to charge the second energy storage, when the state of charge of the second energy storage is lower than a value obtained by adding a second margin to a minimum value of the preferable zone, and wherein the second margin is larger than the first margin.

6. An energy storage device comprising:

a first energy storage having a first capacity deterioration factor;

a second energy storage having a second capacity deterioration factor which has a fluctuation with respect to a state of charge larger than a fluctuation of the first capacity deterioration factor;

converting means for converting at least one of a first voltage output from the first energy storage and a second voltage output from the second energy storage;

controlling means for controlling the converting means to discharge one of the first energy storage and the second energy storage to charge another of the first energy storage and the second energy storage alternately when first temperature of the first energy storage and second temperature of the second energy storage are equal to or lower than a temperature threshold; and determining means for determining which of the first energy storage and the second energy storage is controlled to be discharged first based on the state of charge of the second energy storage, before the controlling the converting means is started, wherein the controlling means performs a high-loss control of the first energy storage and the second energy storage, in which a conversion efficiency of the converting means is lowered, wherein the converting means is controlled to discharge the second energy storage first to charge the first energy storage, when the state of charge of the second energy storage is higher than a preferable zone in which the second capacity deterioration factor of the second energy storage is equal to or lower than a factor threshold, wherein the converting means is controlled to discharge the first energy storage first to charge the second energy storage, when the state of charge of the second energy storage is lower than the preferable zone in which the second capacity deterioration factor of the second energy storage is equal to or lower than the factor threshold, wherein the converting means is controlled to discharge the second energy storage first to charge the first energy storage, when the state of charge of the second energy storage is higher than a value obtained by subtracting a first margin from a maximum value of the preferable zone, wherein the converting means is controlled to discharge the first energy storage first to charge the second energy storage, when the state of charge of the second energy storage is lower than a value obtained by adding a second margin to a minimum value of the preferable zone, and wherein the second margin is larger than the first margin.

* * * * *